United States Patent Office 3,004,049
Patented Oct. 10, 1961

3,004,049
PRODUCTION OF ESTER TYPE ANIONIC
SURFACE ACTIVE AGENTS
Leslie M. Schenck, Mountainside, N.J., assignor to General Aniline & Film Corporation, New York, N.Y., a corporation of Delaware
No Drawing. Filed Dec. 1, 1959, Ser. No. 856,366
16 Claims. (Cl. 260—400)

This invention relates to improvements in the production of ester type anionic surface active agents, and more particularly to an improved process for preparing carboxylic acid esters of 2-hydroxyalkane sulfonic acids.

The reaction of carboxylic acid chlorides with 2-hydroxyethane sulfonic acid (isethionic acid) to produce the corresponding esters is well known and is described for example in U.S. Patents 1,881,172, 2,821,535 and other patents. The preparation of the acid chloride employed as a reactant is not only hazardous but time consuming and costly, since it employs phosphorus trichloride and requires at least one additional step. In addition, a considerable quantity of salt is concurrently produced which is highly undesirable in many uses particularly when the resulting isethionic acid ester is employed in detergent and built soap formulations. Further, the salt in such formulations imparts thereto an unduly high hygroscopicity and its removal is expensive. Still further, the hydrogen chloride produced as a result of the reaction presents additional problems of corrosion and removal.

The reaction of 2-hydroxyalkane sulfonic acids with free carboxylic acids would of course eliminate a number of the above mentioned disadvantages, and processes employing such a reaction have in fact been proposed. Thus, in U.S. Patent 2,635,103, a process is disclosed for reacting one mole of the 2-hydroxyethane sulfonic acid with from more than 0.6 mole to less than one mole of a fatty acid at a temperature of 200-300° C. and at subatmospheric pressures in an inert atmosphere. This process of course involves special handling and equipment and in addition produces a product containing excess isethionate salt which must for most uses be subsequently removed.

In U.S. Patent 2,857,370 and in the copending application of Anderson et al., Serial No. 603,214, filed August 10, 1956, processes are disclosed for the reaction of one mole of 2-hydroxyalkane sulfonic acid salt with at least one mole of the carboxylic acid, in the presence of, respectively, a boron-containing compound or of a phosphorus-containing compound selected from among a specified group of such compounds. Although these processes are highly advantageous in eliminating the problem of removal of excess salt or isethionate and for various other reasons, they are still somewhat plagued with the problems of undue color degradation of the product and/or yields not as high as desired and/or the necessity of employing relatively high reaction temperatures at which degradation and other undesirable side reactions tend to occur.

It is an object of this invention to provide a process for preparing a carboxylic acid ester of a 2-hydroxyalkane sulfonic acid which will not be subject to the above disadvantages. Another object of this invention is the provision of an improved process for producing such esters at lower reaction temperatures and/or higher yields and/or with decreased formation of colored byproducts. Other objects and advantages will appear as the description proceeds.

The attainment of the above objects is made possible by my discovery that when the reaction between the carboxylic acid and the isethionic acid salt is carried out in the presence of a catalytic amount of hypophosphorous acid or a salt thereof, lower reaction temperatures may be employed and/or higher yields may be obtained and/or a highly improved, colorless product is obtained. Absence of color is of course highly important and critical in certain uses and the production of colorless products has hitherto required relatively costly purification procedures. Such procedures may be eliminated by use of the process of this invention.

This invention accordingly comprises a process heating at least 1 mole of an acylating agent selected from the group consisting of free aliphatic and alicyclic monocarboxylic acids of at least 8 carbon atoms with 1 mole of an isethionate of the formula HO—CHR—CHR—SO$_3$M wherein R is selected from the group conisting of H and lower alkyl and M is a cation selected from the group consisting of alkali metals and alkaline earth metals, at an acidic pH and a temperature of about 140 to 320° C. in the presence of a catalytic amount of a compound selected from the group consisting of hypophosphorous acid and its salts, while removing the water formed during the reaction.

When an excess of carboxylic acid is employed in the present process, the final product will inherently contain some free carboxylic acid which may if desired be removed by common extraction or superheated steam distillation procedures. However, a further advantage of this process, in common with the processes disclosed in U.S. Patent 2,880,219 and in the above mentioned Anderson et al. application, resides in the fact that the excess carboxylic acid may be neutralized in situ with an inorganic or organic base such as the alkali metals or amines such as triethanolamine or the like, to produce the corresponding soap in situ. The resulting mixture of soap and isethionate ester may be employed either directly or after addition of other ingredients in the production of detergent compositions and other surface active compositions in liquid or solid form. The use of such compositions in the formation of solid detergent compositions in particulate or bar form is exceedingly advantageous. These compositions may also be employed in the production of skin creams, lotions, salves, and in food products as foaming agents in addition to other uses in which the presence of a mineral acid salt of an alkali metal, alkaline earth metal, ammonium or amine is undesirable.

The duration of the reaction is generally inversely proportional to the temperature employed, the rate of reaction increasing as the temperature increases. However, at higher temperatures, there is a tendency toward the formation of colored by-products and the like while at unduly low temperatures the reaction is too slow for practicaly purposes. The process of this invention, as pointed out above, permits the reaction to proceed at lower temperatures than hitherto possible although of course the temperature employed in any particular instance will be dependent upon the particular acid employed, the degree of purity of product desired, the rate of reaction desired, and the like.

In general, temperatures of about 140-320° C. define the extreme practical limits of operation, a range of about 160-230° C. yielding excellent results in most instances. At temperatures within the aforementioned ranges, the reaction is usually complete in about 10 hours although the duration required for completion of the reaction may range in any particular instance from about ½ to 15 hours.

It is another advantage of this invention that an inert atmosphere such as nitrogen, carbon dioxide or vacuum need not be employed, and the reaction may be carried out in air or even at super-atmospheric pressures. However, it is usually preferred for optimum results to carry out the reaction in the presence of an inert atmosphere which may be maintained, for example, by use of sub-atmospheric pressures or an inert gas or vapor such as nitrogen, carbon dioxide, or saturated or superheated steam, the gas or vapor being preferably passed in continuous manner over the reaction mixture to assist in removal of the water formed during the reaction.

The use of at least one mole of the carboxylic acid acylating agent per mole of isethionate salt (1:1 minimum molar ratio) is essential for the attainment of the desired results. In general, proportions of about 1.2 to 2.5 moles of the acid per mole of isethionate salt have been found sufficient in most instances, although up to 6 to 10 moles or more of the acid may be employed where a product containing a higher free carboxylic acid content is desired. However, any increase in the amount of excess carboxylic acid employed in the reaction mixture, while to some extent aiding in fluidizing and stabilizing the reaction, at the same time tends to increase the cost of the product due to greater heat requirements and increased carboxylic acid losses.

As carboxylic acid acylating agents of at least 8 carbon atoms which may be employed in the instant invention, those preferred are of the aliphatic or alicyclic type although aromatic acids may be used. Particularly preferred are the higher fatty acids of at least 8 carbon atoms. As representative of higher aliphatic and alicyclic carboxylic acids operative in the instant invention, there may be mentioned caprylic acid, pelargonic acid, capric acid, lauric acid, myristic acid, palmitic acid, stearic acid, oleic acid, ricinoleic acid, linoleic acid, undecylenic acid, tall oil acid, acid mixtures from various natural plant and animal oils such as olive, tallow, castor, peanut, coconut, soybean, cotton seed, ucahuba, linseed, cod, herring, menhaden, neatsfoot, sperm, palm, corn, butter, babassu, kapok, hempseed, mustard, rubberseed, rape, safflower, sesame, acids from the oxidation fractions of petroleum and from oxo-aldehydes, naphthenic acids, abietic, acids, and the hydrogenated derivatives of such acids and acid mixtures. Other acids which may be employed include alkyl benzoic acids such as dodecyl benzoic acid, nonyl benzoic acid, octyl benzoic acid, alkyl naphthoic acids such as nonyl naphthoic acid, and the like.

The 2-hydroxyalkane sulfonic acids (isethionates, including $\alpha$ and/or $\beta$ lower alkyl substituted derivatives) employed in the form of their salts in the present process have the formula given above. In this formula, R may represent hydrogen, methyl or ethyl, and M may represent an alkaline earth metal such as calcium, magnesium, or barium or preferably an alkali metal such as sodium or potassium. As examples of isethionic acids useful in the form of their salts in the present process, there may be mentioned isethionic acid, 2-hydroxypropane sulfonic acid, 2-hydroxy-3-butane sulfonic acid, 2-hydroxy-1-butane sulfonic acid and the like. These salts are preferably employed in the form of dry powders, but they may also be employed as aqueous solutions since the water is removed from the reaction medium together with the water formed as a result of the reaction in accordance with this process.

An essential feature of this invention resides in the addition to the reaction medium of a small, effective or catalytic amount of hypophosphorous acid or a salt thereof. Generally about 0.1 to 10%, and preferably about 0.3 to 1.5% of such acid or salt, based on the weight of the carboxylic acid acylating agent, is sufficient to provide the desired improvements in lower reaction temperatures and/or prevention of color degradation of the product and/or increased yields and the like. Hypophosphorous acid and its alkali metal salts, e.g. sodium and potassium salts are generally preferred although any metal (including alkali metal and alkaline earth metal), ammonium or amine salt of the hypophosphorous acid may be employed. These salts may be employed in their hydrated or dehydrated form. As examples of such salts, there may be mentioned aluminum, cadmium, sodium, potassium, lithium, calcium, strontium, barium, magnesium, ammonium, mono-, di-, and trimethylamine, -ethylamine, -propylamine, -ethanolamine, and -propanolamine, pyridinyl, and morpholinyl hypophosphites. When hypophosphorous acid is employed, it is preferred to use a 10 to 50% aqueous solution thereof.

The reaction must be carried out at an acidic pH, a range of about 2.5 to 3.5 being preferred to assure optimum acceleration of the desired esterification reaction. The afore-mentioned amount of hypophosphorous acid may suffice to bring the reaction medium to within the desired pH range, or a second acid may be employed in conjunction with the hypophosphorous acid or salt thereof. Any suitable acid may be employed for this purpose, inorganic acids such as phosphoric acid, hypophosphoric acid, phosphorus acid, boric acid, fluoroboric acid, hydrochloric acid, sulfuric acid and the like being preferred.

It will be understood that the reactants and hypophosphorous acid compound essential to the present process may be admixed in any order, although it is preferred to first mix the hypophosphorous acid compound with the carboxylic acid acylating agent and then slowly add the isethionate salt reactant thereto.

The inhibition of color formation in the product by the addition of hypophosphorous acid or its salts is entirely unexpected and very surprising based on other experimental data. In heat stability tests, fatty acids with an intial VCS (Varnish Color Scale, Gardner Scale, Standards of 1933) of 1 were admixed with, respectively, 1% of sodium hypophosphite and 1% of hypophosphorous acid and subjected to temperatures of 160° C. for 6 hours. The treated samples as well as untreated controls showed the same degree of color degradation, namely a VCS of 9. Further, when, instead of hypophosphorous acid or its salts, the present reaction was carried out with additions of 1 to 1.5% by weight of the fatty acid of other strong reducing agents, including titanous chloride ($TiCl_3$), hydroxylamine, stannous chloride, cobaltous chloride, sodium sulfite, sodium bisulfite, sodium meta arsenite ($NaAsO_2$), and zinc dust, no beneficial effects on the color of the products were obtained even though the above described pH requirements were maintained by use of phosphoric acid.

The products of this invention may be employed in a multitude of uses wherever an anionic surface active agent is called for, including the uses referred to in U.S. 2,880,-219, column 5, line 30 to column 6, line 45.

The following examples are illustrative of the present invention and are not to be regarded as limitative. All parts and proportions referred to herein and in the appended claims are by weight unless otherwise indicated.

*Example 1*

(A) Into a 1 liter electrically heated fusion pot fitted with an agitator, thermometer, dropping funnel, distillation condenser and inlet for inert gas is charged: 300 g. coconut fatty acid (1.41 moles, M.W. 212) and 8 g. 50% hypophosphorous acid (4 g. 100%=1.33% by weight of fatty acid charged). The reaction mixture is heated to 200° C. under a slow stream of nitrogen to remove moisture, and there is added over five minutes with agitation 103.5 g. sodium isethionate (0.7 mole, M.W. 148). The reaction mixture is agitated two hours at 200° C. at the end of which time the mixture by analysis contains 0.69 mole of the coconut fatty acid ester of sodium isethionate (236.2 g. 100% ester, M.W. 342). The product, obtained in over 99% of the theoretical yield, based on the sodium isethionate, has a pH of 3.2 as a 10% slurry in 1:1 isopropanol-water. The pH is adjusted to 7.0 by mechanical admixture with sodium hydroxide, and a 2.5% solution of the resultant free-flowing dry powder gives a APHA color of 3.

(B) As a control, Example 1A is repeated substituting 6.2 g. 85% phosphoric acid for the 8 g. 50% hypophosphorous acid. After two hours heating at 200° C., there is obtained by analysis 0.603 mole of the sodium isethionate ester of coconut fatty acid (206 g. 100% ester, M.W. 342). A 10% slurry of the product in 1:1 distilled water-isopropanol has a pH of 3.15. Upon neutralization to pH 7 with sodium hydroxide, the APHA color of a 2.5% solution is found to be 63.

*Example 2*

Example 1A is repeated, with the exception that the reaction mixture is agitated at 155° C. until by analysis 93.2% of the sodium isethionate charged is converted to the corresponding coconut fatty acid ester of sodium isethionate. The APHA color of a 2.5% solution is found to be 5.

*Example 3*

(A) An admixture of 285 g. tallow fatty acid (1 mole, M.W. 285), 2.85 g. 50% hypophosphorous acid (0.5% by weight based on the fatty acid charged) and 97.6 g. (0.66 mole) of sodium isethionate is agitated at 230° C. for one hour at 240 mm. pressure to assist in removing the water formed during the esterification. There is obtained by analysis 265 g. (0.64 mole, M.W. 415) of the tallow fatty acid ester of sodium isethionate, representing 97% of the theoretical yield. The product, with a pH of 2.7, has an APHA color of 7 as a 2.5% solution.

(B) Operating as in 3A with the exception that the 2.85 g. 50% hypophosphorous acid are eliminated from the reaction mixture, there is obtained by analysis 138 g. (0.33 mole) of the tallow fatty acid ester of sodium isethionate. This product, with a pH 5.5, has an APHA color of over 100 as a 2.5% solution.

*Example 4*

(A) An admixture of 345 g. coconut fatty acid (1.4 moles) 4 g. sodium hypophosphite and 103.5 g. sodium isethionate (0.7 mole) is agitated 10 hours at 160° C. Upon analysis, the reaction mixture is found to contain 50.4 g. (0.147 mole) of the sodium salt of the isethionic acid ester of coconut fatty acid representing 21% of the theoretical conversion. The mixture has a pH of 4.4, and the APHA color of a 2.5% solution is 4.

(B) Operating in the identical manner in 4A, with the exception that 8.5 g. phosphoric acid 85% are added to reduce the pH of the reaction mixture to 2.9, there is obtained 234 g. (.685 mole) of the sodium salt of the isethionic acid ester of coconut fatty acid representing 98% of the theoretical conversion. The APHA color of a 2.5% solution of the product is 5.

(C) Operating in the identical manner of 4A, with the exception that the 4 g. sodium hypophosphite are eliminated, there is obtained by analysis 53.7 g. (.157 mole) of the sodium salt of the isethionic ester of coconut fatty acid representing 22.1% of the theoretical conversion. The product has a pH of 4.8, and the APHA color of a 2.5% solution is 71.

(D) Operating in an identical manner as in 4A, with the exception that the 4 g. sodium hypophosphite are replaced with 8.5 g. 85% phosphoric acid, there is obtained 217 g. (.635 mole) of the coconut fatty acid ester of sodium isethionate, representing 90.6% of the theoretical yield. The product has a pH of 3.0 in 1:1 isopropanol-water, and the APHA color of a 2.5% solution is 48.

*Example 5*

(A) Operating as in Example 1A, an admixture of 274 g. commercial stearic acid (1 mole), 1.6 g. 50% hypophosphorous acid and 113.4 g. (0.7 mole) sodium-β-methylisethionate is reacted at 210° C., and 97% of the theoretical conversion of the isethionate to the stearic acid ester of sodium-β-methylisethionate is obtained. The product, with a pH of 3.3, has an APHA color of 8 when examined as a 2.5% solution.

(B) Operating as in 5A, with the exception that 1 g. 85% phosphoric acid is substituted for the hypophosphorous acid, an APHA color of 53 on a 2.5% solution of the product is observed, and less than 50% conversion of the sodium-β-methylisethionate to the desired stearic acid ester is accomplished.

This invention has been disclosed with respect to certain preferred embodiments, and there will become obvious to persons skilled in the art various modifications, equivalents or variations thereof which are intended to be included within the spirit and scope of this invention.

I claim:

1. A process comprising heating at least 1 mole of an acylating agent selected from the group consisting of free aliphatic and alicyclic monocarboxylic acids of from 8 to 22 carbon atoms with 1 mole of an isethionate of the formula HO—CHR—CHR—SO₃M wherein R is selected from the group consisting of H and lower alkyl and M is a cation selected from the group consisting of alkali metals and alkaline earth metals, at an acidic pH and a temperature of about 140 to 320° C. in the presence of a catalytic amount of a compound selected from the group consisting of hypophosphorous acid and its metal, ammonium and amine salts, while removing the water formed during the reaction.

2. A process as defined in claim 1 wherein the acylating agent is a fatty acid.

3. A process as defined in claim 1 wherein the isethionate is sodium isethionate.

4. A process as defined in claim 1 wherein the isethionate is sodium-β-methylisethionate.

5. A process as defined in claim 1 wherein said compound is hypophosphorous acid.

6. A process as defined in claim 1 wherein said compound is sodium hypophosphite.

7. A process as defined in claim 1 wherein the pH ranges from about 2.5 to 3.5.

8. A process as defined in claim 1 wherein about 1.2 to 2.5 moles of the acylating agent are heated with 1 mole of the isethionate.

9. A process as defined in claim 1 wherein the temperature is about 160 to 230° C.

10. A process comprising heating at least 1 mole of a fatty acid of from 8 to 22 carbon atoms with 1 mole of a sodium isethionate at a pH of about 2.5 to 3.5 in the presence of a catalytic amount of a compound selected from the group consisting of hypophosphorous acid and its metal, ammonium and amine salts while removing the water formed during the reaction.

11. A process as defined in claim 10 wherein said compound is hypophosphorous acid.

12. A process as defined in claim 10 wherein said compound is sodium hypophosphite.

13. A process as defined in claim 10 wherein the temperature is about 160 to 230° C.

14. A process as defined in claim 10 wherein said compound is employed in an amount ranging from about 0.3 to 1.5% by weight of the fatty acid.

15. A process as defined in claim 1 wherein said compound is an alkali metal salt of hypophosphorous acid.

16. A process as defined in claim 10 wherein said compound is an alkali metal salt of hypophosphorous acid.

No references cited.